(12) United States Patent
Taylor

(10) Patent No.: US 11,439,293 B2
(45) Date of Patent: Sep. 13, 2022

(54) SHOE SUPPORT AND ATTACHMENT DEVICE

(71) Applicant: Jeffrey Taylor, Bakersfield, CA (US)

(72) Inventor: Jeffrey Taylor, Bakersfield, CA (US)

( * ) Notice: Subject to any disclaimer, the term of this patent is extended or adjusted under 35 U.S.C. 154(b) by 338 days.

(21) Appl. No.: 16/794,773

(22) Filed: Feb. 19, 2020

(65) Prior Publication Data
US 2020/0397220 A1   Dec. 24, 2020

Related U.S. Application Data

(60) Provisional application No. 62/864,220, filed on Jun. 20, 2019.

(51) Int. Cl.
*A47L 23/18* (2006.01)
*F16B 1/00* (2006.01)
*F16B 2/12* (2006.01)

(52) U.S. Cl.
CPC ............... *A47L 23/18* (2013.01); *F16B 1/00* (2013.01); *F16B 2/12* (2013.01); *F16B 2001/0035* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,702,016 A * | 10/1987 | Grigsby | ............... | D06F 58/04 34/106 |
| 5,024,408 A * | 6/1991 | Magee | ............... | D06F 58/04 248/316.4 |
| 5,220,734 A * | 6/1993 | Carver | ............... | D06F 58/04 34/104 |
| 5,365,675 A | 11/1994 | Shabram, Jr. | | |
| 5,623,769 A | 4/1997 | Hayden | | |
| 5,833,191 A * | 11/1998 | Gennep | ............... | F16M 11/14 248/316.4 |
| 5,836,087 A | 11/1998 | Wilson et al. | | |
| 6,178,665 B1 * | 1/2001 | MacPhail | ............... | A63C 17/262 36/117.7 |
| 6,286,797 B1 * | 9/2001 | Thaxton | ............... | F16M 13/022 248/316.4 |
| 6,385,862 B1 * | 5/2002 | Vande Haar | ............... | D06F 58/04 34/106 |
| 7,228,646 B1 | 6/2007 | Purcell | | |
| 8,015,727 B2 | 9/2011 | Lee et al. | | |
| 2009/0300934 A1 * | 12/2009 | Hesse | ............... | D06F 58/04 34/106 |
| 2013/0134273 A1 * | 5/2013 | Halverson | ............... | B23P 11/00 29/525.08 |
| 2015/0174503 A1 * | 6/2015 | Vogel | ............... | A63H 33/185 29/428 |
| 2017/0065149 A1 * | 3/2017 | Dowell | ............... | A47L 23/20 |
| 2019/0365198 A1 * | 12/2019 | Santiago | ............... | A47L 23/20 |
| 2020/0291973 A1 * | 9/2020 | Gassaway | ............... | F16B 1/00 |

* cited by examiner

*Primary Examiner* — Monica E Millner
(74) *Attorney, Agent, or Firm* — Boudwin Intellectual Property; Daniel Boudwin

(57) ABSTRACT

A shoe support and attachment device including a base that has a pair of sidewalls rising therefrom. The sidewalls are angled inward such that they are closer together at a topside thereof. The base and the sidewalls frictionally engage a shoe therebetween. The base has a telescopic adjustment that is controlled by an adjustment screw. At least one fastener is placed on a bottom side of the base opposite the sidewalls. The fastener attaches the device to the interior of a drier.

13 Claims, 5 Drawing Sheets

SHOE SUPPORT AND ATTACHMENT DEVICE

CROSS REFERENCE TO RELATED APPLICATIONS

This application claims the benefit of U.S. Provisional Application No. 62/864,220 filed on Jun. 20, 2019. The above identified patent application is herein incorporated by reference in its entirety to provide continuity of disclosure.

BACKGROUND OF THE INVENTION

The present invention relates to a shoe support and attachment device. More particularly, the present invention provides a device that is configured to hold a shoe in place while in a drier.

Many individuals like having clean shoes. This can be extremely difficult due to everyday conditions. With rain and mud and other dirt and grime shoes often become dirty. In some instances, an individual will purchase a new expensive pair of shoes. In most instances however a person will elect to save money and wash their shoes. This will often leave shoes wet and in need of drying.

In one instance, these shoes may be put outside to dry. This solution however, may lead to the shoes becoming dirty again before they are even worn. Other times shoes are placed by a dehumidifier. This process still takes a large amount of time to dry shoes. In most instances many people will elect to place their shoes in a drier. This can cause a large amount of noise. Further, the constant banging of the shoes as they tumble in the drier may cause damage to the drier over time. One result of shoes tumbling in the drier is that the drier door will open causing the drier to turn off.

Consequently, there is a need for an improvement in the art of cleaning and drying shoes. The present invention substantially diverges in design elements from the known art while at the same time solves a problem many people face when drying shoes with a tumble dryer. In this regard the present invention substantially fulfills these needs.

SUMMARY OF THE INVENTION

The present invention provides a shoe support and attachment device wherein the same can be utilized for providing convenience for the user when using a drier to dry freshly cleaned shoes. The shoe support and attachment device includes a base that has a pair of sidewalls rising vertically from opposite edges of the base. The sidewalls are each curved inward towards each other. The side walls are rounded in a concave manner relative to an outside plane of the sidewalls. The planar base and the sidewalls are configured to frictionally attach to an arch portion of a shoe. At least one fastener is placed on a bottom side of the base, wherein the bottom side is the side opposite the sidewalls.

Another object of the shoe support and attachment device is to have the base include a plurality of flexible ridges.

Another object of the shoe support and attachment device is to have a telescopic adjustment within the base.

Another object of the shoe support and attachment device is to have a screw adjuster within the telescopic adjustment.

Another object of the shoe support and attachment device is to have the device configured such that turning the screw adjuster will tighten or expand the base.

Another object of the shoe support and attachment device is to have the base and the sidewalls be made from a thermal resistant material.

Another object of the shoe support and attachment device is to have the at least one fastener be a magnet.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
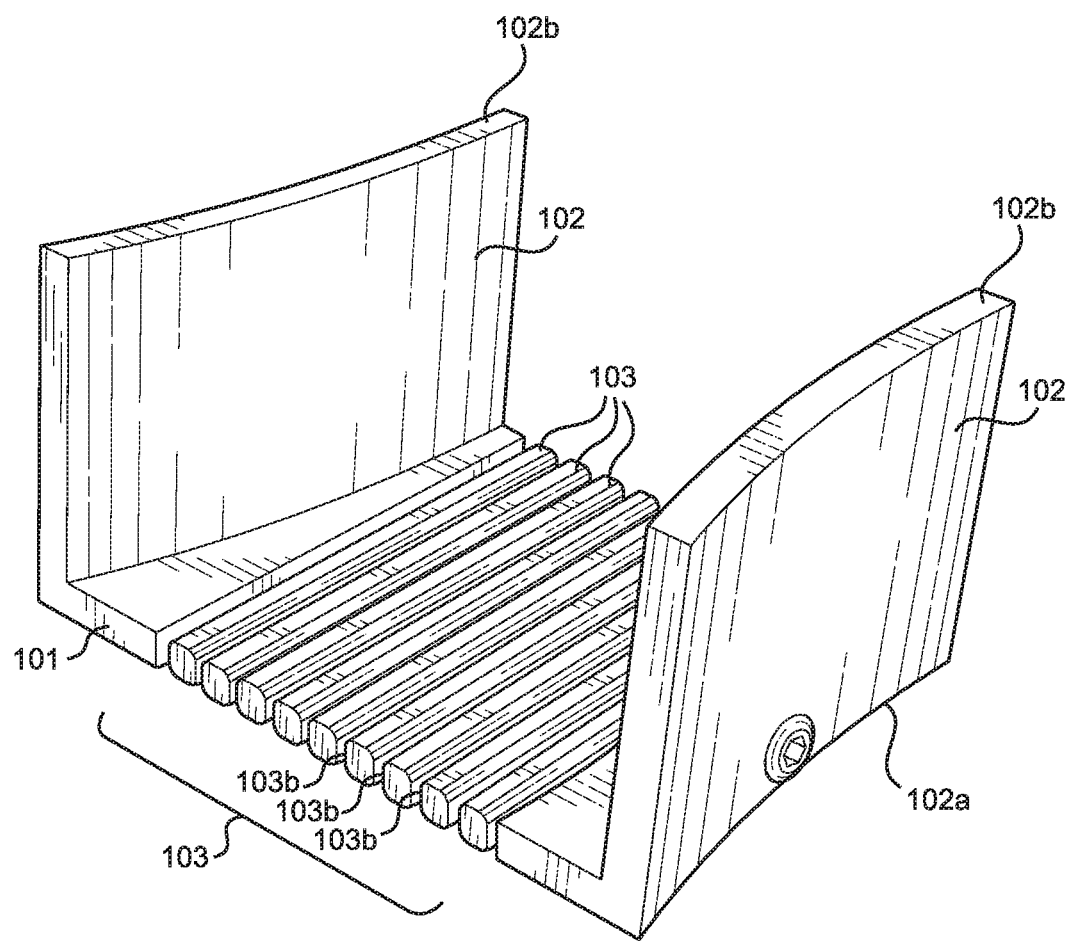
FIG. 1 shows a perspective view of an embodiment of the shoe support and attachment device.

Reference is made herein to the attached drawings. Like reference numerals are used throughout the drawings to depict like or similar elements of the shoe support and attachment device. For the purposes of presenting a brief and clear description of the present invention, a preferred embodiment will be discussed as used for the shoe support and attachment device. The figures are intended for representative purposes only and should not be considered to be limiting in any respect.

Referring now to FIG. 1, there is shown a perspective view of an embodiment of the shoe support and attachment device. The shoe support and attachment device includes a base 101. In one embodiment the base 101 is a planar base. In the illustrated embodiment, the base 101 is configured to have an accordion configuration. This means that the base 101 will have a plurality of flexible ridges 103. The flexible ridges 103 will alternate having peaks 103a and valleys 103b. These flexible ridges 103 will allow the base 101 to extend and retract. The peaks 103a are coplanar with the base 101 allowing the device to still sit flat on a surface no matter the width.

The base 101 has two sidewalls 102 rising therefrom. The sidewalls 102 rise upwardly from the base 101. The sidewalk 102 are attached to the base 101 at opposing edges. This will create a volume between the sidewalls 102. In the shown embodiment the sidewalls 102 are rounded in a concave inward formation. This will allow the sidewalls 102 to contour to the sides of a shoe.

In one embodiment the sidewalls 102 are attached to the base 101 such that the sidewalls 102 curve inward. This will apply pressure to a shoe better holding it in place. In this embodiment the sidewalls 102 are attached to the base 101 by the bottom 102a of the sidewalls 102. The sidewalls 102 are attached at an angel such that the tops 102b of the sidewalls 102 are closer to each other than the bottoms 102a of the sidewalls 102.

In one embodiment the base 101 and the sidewalls 102 are made from a thermal resistant material. In a further embodiment the thermal resistant material is a plastic material. In one embodiment the plastic is a flexible plastic. In yet another embodiment the plastic is a hard plastic. In another embodiment the material is a rubber material.

Figure 2:
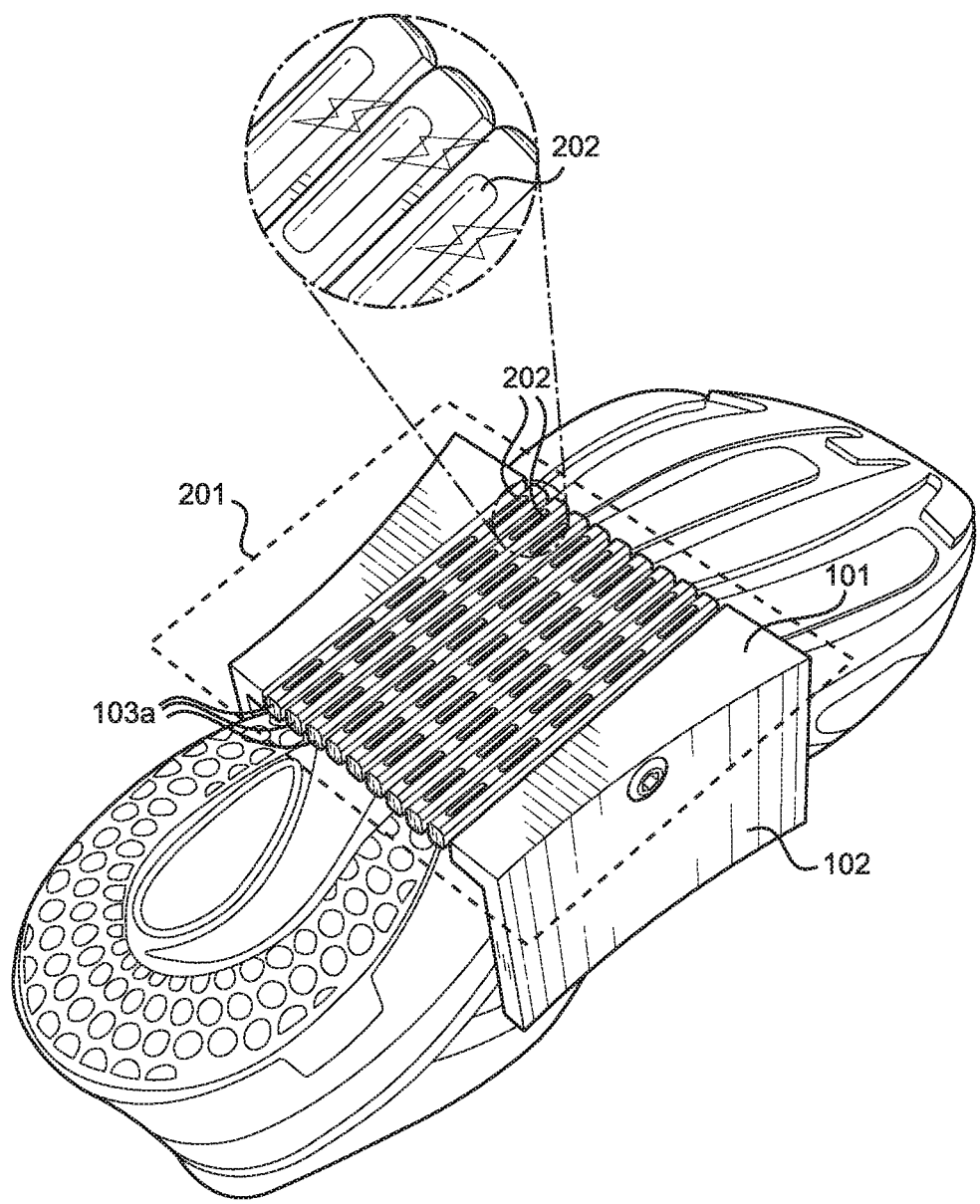
FIG. 2 shows a bottom up view of an embodiment of the shoe support and attachment device.

Referring now to FIG. 2 there is shown a bottom up view of an embodiment of the shoe support and attachment device. The underside 201 of the base 101 is the surface that is the side opposite the surface having the sidewalls on either side. The underside 201 of the base 101 has at least one securement device 202 located thereon. In one embodiment the securement device takes up the entirety of the underside 201 of the base 101. In another embodiment there is a plurality of securement devices 202.

In an embodiment where there is a plurality of securement devices 202 the devices are placed on the edge of the underside 201. In another embodiment the plurality of securer ent devices 202 are attached periodically across the entire underside 201 of the base 101. In one embodiment the securement device 202 is a magnet or a plurality of magnets.

In the shown embodiment the plurality of securement devices 202 are located within the peaks 103a of the underside of the base 101. The shown embodiment will allow the securement devices 202 to be placed in direct contact with a surface. This will ensure that the device has the best attachment to the desired surface possible.

Figure 3:
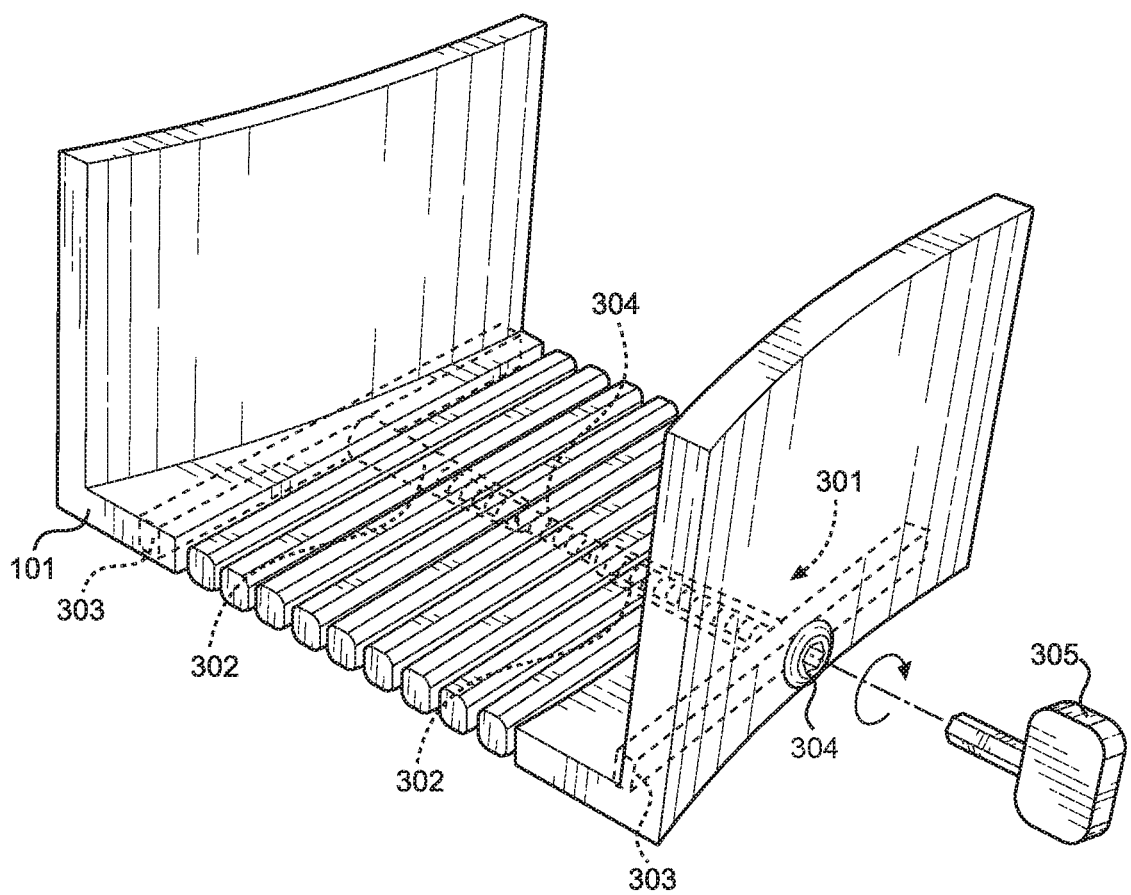
FIG. 3 shows a perspective view of an embodiment of the shoe support and attachment device.

Referring now to FIG. 3 there is shown a perspective view of an embodiment of the shoe support and attachment device. In this view there is shown a telescopic insert 301. The telescopic insert 301 is located in the base 101 of the shoe support and attachment device. This will allow the base 101 to expanded and retract. In one embodiment the telescopic insert 301 is a two-piece design having a first side and a second side. In this embodiment the first side and the second side will fit together forming a retractable plate. This retractable plate will cover a majority of the base.

In another embodiment the telescopic insert 301 is comprised of at least one telescopic bar 302 and two cross supports 303. In further embodiments there is at least two telescopic bars 302 located within the base 101. The telescopic bar 302 is connected together to each of the cross supports 303. In one embodiment the telescopic bar 302 is configured to frictionally hold a desired width. This is accomplished by having one part of the telescopic bar 302 frictionally placed within another part of the telescopic bar 302.

In another embodiment there is a securement screw 304 that is part of the telescopic insert 301. In this embodiment this will ensure that the securement screw 304 will be maintained within the base. An end of the securement screw 304 will be accessed from an aperture located in the side of the base 101.

In some embodiments the securement screw 304 will be configured to accept a turn-key 305. In one embodiment the turn-key 305 is configured to have a unique connection shape. This will prevent the shoes from being removed from the device while in the drier. In other embodiments the turn-key 305 has a basic shape such as a hex pattern. When the turn-key is placed within the securement screw 304 and turned the screw will allow the telescopic insert to expand or retract. This is because the securement screw 304 will either push the cross supports 303 apart or pull the cross supports 303 together.

Figure 4:
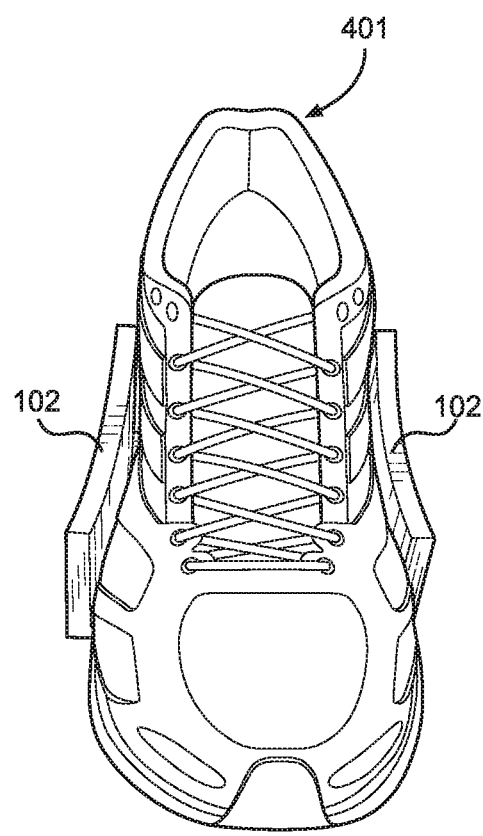
FIG. 4 shows a perspective view of an embodiment of the shoe support and attachment device with a shoe therein.

Referring now to FIG. 4, there is shown a perspective view of an embodiment of the shoe support and attachment device with a shoe therein. The shoe support and attachment device holds a shoe 401 therein. In one embodiment the shoe support and attachment device is expanded to allow the shoe 401 to be fit therein. The shoe support and attachment device is then closed back around the shoe 401. In one embodiment the sidewalls 102 further squeeze the shoe 401 into place. In a further embodiment the turn-key is used to further secure the shoe 401. In this embodiment the turn-key is used to turn the securement screw. This will hold the shoe support and attachment device at the desired width around the shoe 401.

Figure 5:
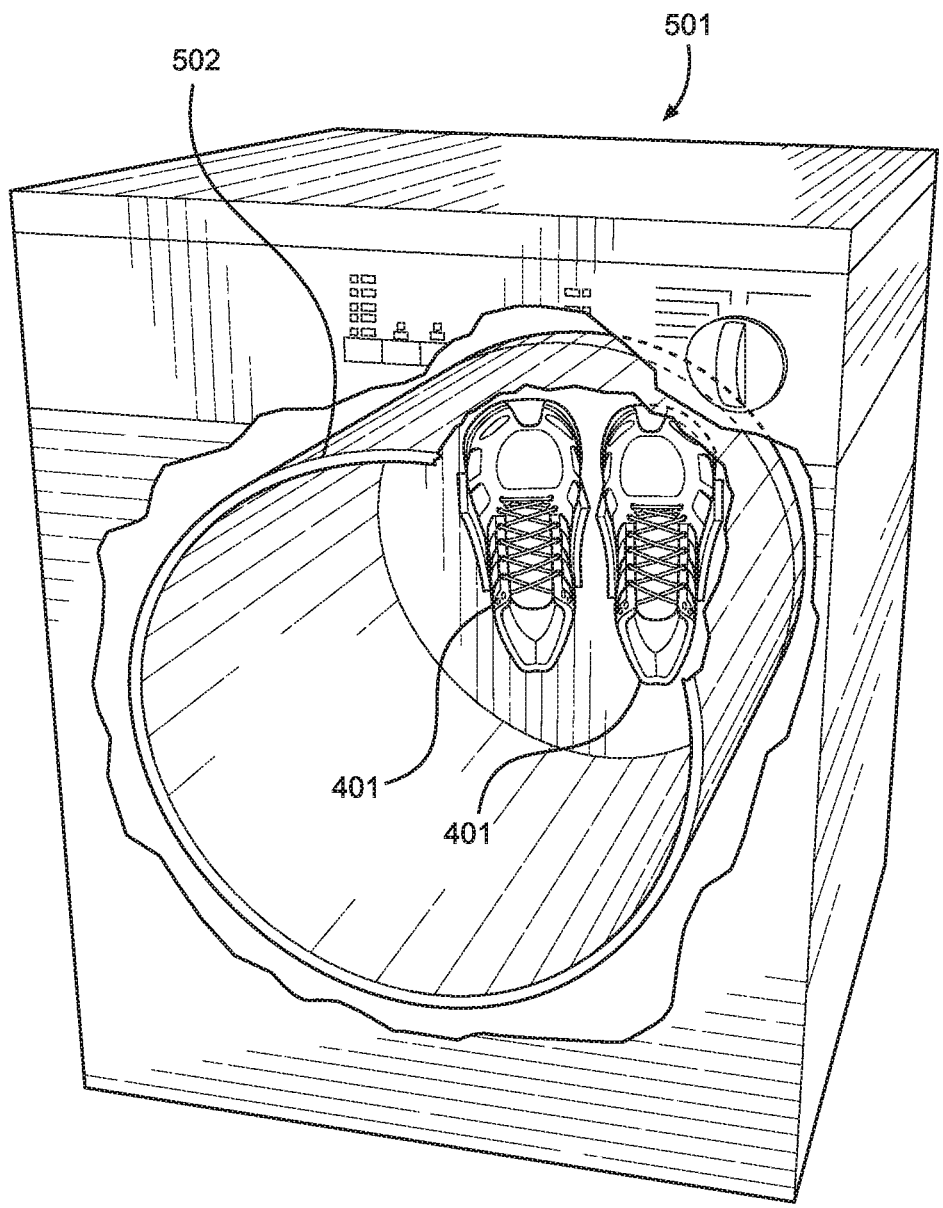
FIG. 5 shows an in-use view of an embodiment of the shoe support and attachment device.

Referring now to FIG. 5 there is shown an in-use view of an embodiment of the shoe support and attachment device. In use the shoe support and attachment device is secured to the interior of a dryer 501. In one embodiment the device is attached directly to the inner tube 502 of the dryer 501. In one embodiment the magnets on the bottom of the shoe support and attachment device attached to the inner tube 502 of the dryer 501. In another embodiment a special attachment point may be secured to the inner tube 502 of the dryer 501. In one embodiment the special attachment point is a magnet with an opposite attraction as the magnets located within the bottom of the shoe support. This will ensure a tight securement. In another embodiment the special attachment point is a magnetic material secured within the inner tube 502 of the dryer 501.

In use the shoe support and attachment device holds a shoe in the dryer. As the dryer runs the shoe 401 will dry. However, the shoes 401 will not tumble and slam against the inner tube 502. The shoes 401 will be held in place against the inner tube 502. The shoes 401 will still be able to be dried and will not create a noise.

It is therefore submitted that the invention has been shown and described in what is considered to be the most practical and preferred embodiments. It is recognized, however, that modifications may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A shoe support and attachment device, the device comprising:
   a base comprising at least one pair of opposing edges;
   a pair of sidewalls disposed on each opposing edge of the at least one pair of opposing edges; whereby the pair of sidewalls extend vertically from the at least one pair of opposite edges of the base;
   wherein each side wall of the pair of sidewalls are each curved inward towards each other;
   at least one securement device placed within the base;
   at least one fastener disposed on a bottom side of the base opposite the sidewalls
   the least one securement device further comprises a pair of cross supports, at least one telescopic bar, and a securement screw;

whereby a first cross support of the pair of cross supports is disposed on a first opposing edge of the at least one pair of opposing edges;

whereby a second cross support of the pair of cross supports is disposed on a second opposing edge of the at least one pair of opposing edges;

wherein the first cross support is parallel to the second cross support;

a first telescopic bar perpendicularly disposed on the first cross support;

a second telescopic bar perpendicularly disposed on the second cross support;

the securement screw extends through the first cross support, the first telescopic bar, and into the second telescopic bar.

2. The shoe support and attachment device of claim 1, wherein the base has a plurality of flexible ridges.

3. The shoe support and attachment device of claim 1, further comprising a screw adjuster within the telescopic adjustment.

4. The shoe support and attachment device, 3, wherein turning the screw adjuster will tighten or expand the base.

5. The shoe support and attachment device of claim 1, wherein the base and the sidewalls are made from a thermal resistant material.

6. The shoe support and attachment device of claim 1, wherein the at least one fastener is a magnet.

7. A shoe support and attachment device, the device comprising:

a base comprising at least one pair of opposing edges;

a pair of sidewalls disposed on each opposing edge of the at least one pair of opposing edges; whereby the pair of sidewalls extend vertically from the at least one pair of opposite edges of the base;

wherein each sidewall of the pair of sidewalls are rounded in a concave manner relative to an outside plane of the sidewalls;

the base and the sidewalls are configured to frictionally attach to an arch portion of a shoe;

at least one securement device placed within the base;

the least one securement device further comprises a pair of cross supports, at least one telescopic bar, and a securement screw;

at least one fastener disposed on a bottom side of the base opposite the sidewalls whereby a first cross support of the pair of cross supports is disposed on a first opposing edge of the at least one pair of opposing edges;

whereby a second cross support of the pair of cross supports is disposed on a second opposing edge of the at least one pair of opposing edges;

wherein the first cross support is parallel to the second cross support;

a first telescopic bar perpendicularly disposed on the first cross support;

a second telescopic bar perpendicularly disposed on the second cross support;

the securement screw extends through the first cross support, the first telescopic bar, and into the second telescopic bar.

8. The shoe support and attachment device of claim 7, wherein the base has a plurality of flexible ridges.

9. The shoe support and attachment device of claim 7, further comprising a telescopic adjustment within the base.

10. The shoe support and attachment device of claim 8, further comprising a screw adjuster within the telescopic adjustment.

11. The shoe support and attachment device, 10, wherein turning the screw adjuster will tighten or expand the base.

12. The shoe support and attachment device of claim 7, wherein the base and the sidewalls are made from a thermal resistant material.

13. The shoe support and attachment device of claim 7, wherein the at least one fastener is a magnet.

* * * * *